(12) United States Patent
Maalej

(10) Patent No.: US 12,445,663 B1
(45) Date of Patent: Oct. 14, 2025

(54) APPARATUS AND METHODS FOR A LARGE LANGUAGE MODEL WITH SEMANTIC AUDIO FOR TARGETED ADVERTISING VIDEO STREAM

(71) Applicant: Charter Communications Operating, LLC, St. Louis, MO (US)

(72) Inventor: Yassine Maalej, Aurora, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 18/634,692

(22) Filed: Apr. 12, 2024

(51) Int. Cl.
  *H04N 21/234* (2011.01)
  *G06F 40/284* (2020.01)
  *G06F 40/30* (2020.01)
  *G06Q 30/0251* (2023.01)

(52) U.S. Cl.
  CPC ..... *H04N 21/23424* (2013.01); *G06F 40/284* (2020.01); *G06F 40/30* (2020.01); *G06Q 30/0251* (2013.01)

(58) Field of Classification Search
  CPC . H04N 21/23424; G06F 40/284; G06F 40/30; G06Q 30/0251
  See application file for complete search history.

(56) References Cited

U.S. PATENT DOCUMENTS

| | | | |
|---|---|---|---|
| 10,313,722 B1 | 6/2019 | Searl et al. | |
| 11,252,449 B2 | 2/2022 | Maalej et al. | |
| 2014/0359656 A1* | 12/2014 | Banica | H04N 21/812 |
| 2016/0358632 A1 | 12/2016 | Lakhani et al. | |
| 2018/0204111 A1 | 7/2018 | Zadeh et al. | |
| 2022/0014804 A1 | 1/2022 | Maalej et al. | |
| 2024/0355064 A1 | 10/2024 | Skrypnyk et al. | |
| 2025/0080795 A1 | 3/2025 | Nemalipuri et al. | |

FOREIGN PATENT DOCUMENTS

WO 2014200468 A1 12/2014

* cited by examiner

*Primary Examiner* — Anthony Bantamoi
(74) *Attorney, Agent, or Firm* — The Marbury Law Group, PLLC

(57) ABSTRACT

A method for selecting and inserting contextually relevant advertisements into a video stream, executed by a processing system in a network server computing device, encompasses receiving a primary video stream with potential advertisement insertion points indicated by SCTE35/SCTE104 markers, extracting an audio segment from this stream before an advertisement break, obtaining audio from potential advertisements, transcribing both primary and secondary audio segments into textual data, performing semantic analysis and tokenization on this data, creating vector embeddings, and normalizing these embeddings for a feed-forward neural network. The method further involves determining semantic similarity scores between the primary and secondary content through a transformer-based AI model, generating a similarity matrix from these scores, identifying the most contextually aligned advertisement based on these scores, and inserting this advertisement at an indicated break point in the primary video stream.

27 Claims, 5 Drawing Sheets

APPARATUS AND METHODS FOR A LARGE LANGUAGE MODEL WITH SEMANTIC AUDIO FOR TARGETED ADVERTISING VIDEO STREAM

BACKGROUND

The insertion of advertisements ("ads") in television and other video formats has a long history. Originally, video containing an ad was spliced into the original video information manually. Later, systems were developed to automate the insertion of ads into video streams, such as at indicated insertion points in the video. Pre-recorded ads inserted into video streams have been selected based on the expected viewership of a given video stream. More recently, concepts for selecting a prerecorded ad for insertion into a video stream responsive to a context or storyline in the video stream have been developed. Such ad insertion methods have leveraged pre-recorded ads. Consequently, ads in television and other video streams may be inserted many times that are not necessarily consistent with the storyline in the interrupted video.

SUMMARY

Various aspects include methods and apparatuses for inserting contextually relevant advertisements into a video stream, which may include receiving a primary video stream, extracting an audio segment from the received primary video stream in response to detecting an SCTE35/SCTE104 marker in the received primary video stream, extracting audio segments from a plurality of sources of secondary video content that include potential advertisements for insertion into the primary video stream, using speech recognition technology to transcribe spoken words from the audio segment extracted from the received primary video stream and the audio segments extracted from the plurality of sources of the secondary video content into textual data, using the textual data to query a large generative artificial intelligence model (LXM) to perform semantic analysis, generate semantic analysis results, and tokenize the generated semantic analysis results into tokenized data that includes sentences or semantically coherent units, transforming the tokenized data into vector embeddings, determining semantic similarity scores between the vector embeddings of the audio segment extracted from the received primary video stream and the audio segments extracted from the plurality of sources of the secondary video content, using the determined semantic similarity scores to identify an advertisement in the secondary video content that has the highest semantic similarity score in relation to the audio segment extracted from the received primary video stream, and inserting the identified advertisement into the primary video stream at an advertisement breakpoint indicated by the SCTE35/SCTE104 marker.

Some aspects may further include receiving a primary video stream, extracting an audio segment from the received primary video stream in response to detecting an SCTE35/SCTE104 marker in the received primary video stream, extracting audio segments from a plurality of sources of secondary video content that include potential advertisements for insertion into the primary video stream, using speech recognition technology to transcribe spoken words from the audio segment extracted from the received primary video stream and the audio segments extracted from the plurality of sources of the secondary video content into textual data, using the textual data to query a large generative artificial intelligence model (LXM) to perform semantic analysis, generate semantic analysis results, and tokenize the generated semantic analysis results into tokenized data that may include sentences or semantically coherent units, transforming the tokenized data into vector embeddings, determining semantic similarity scores between the vector embeddings of the audio segment extracted from the received primary video stream and the audio segments extracted from the plurality of sources of the secondary video content, using the determined semantic similarity scores to identify an advertisement in the secondary video content that has the highest semantic similarity score in relation to the audio segment extracted from the received primary video stream, and inserting the identified advertisement into the primary video stream at an advertisement breakpoint indicated by the SCTE35/SCTE104 marker.

In some aspects, receiving the primary video stream may include receiving live or video-on-demand (VoD) content with embedded SCTE35/SCTE104 markers indicating potential advertisement insertion points. In some aspects, extracting the audio segment from the received primary video stream in response to detecting the SCTE35/SCTE104 marker in the received primary video stream may include extracting the audio segment from the received primary video stream between one to two minutes prior to a designated advertisement break. In some aspects, transforming the tokenized data into the vector embeddings further may include normalizing the vector embeddings to conform to the input specifications of a feed-forward neural network.

In some aspects, using the determined semantic similarity scores to identify an advertisement in the secondary video content that has the highest semantic similarity score in relation to the audio segment extracted from the received primary video stream may include using the generated similarity matrix to identify a most contextually aligned advertisement for insertion into the primary video stream. In some aspects, generating the similarity matrix based on the determined semantic similarity scores may include generating a matrix information structure in which each row corresponds to a vector embedding of the audio segment extracted from the received primary video stream, each column corresponds to vector embeddings of the audio segments extracted from the plurality of sources of the secondary video content, and each entry in the matrix information structure represents at least one of the determined semantic similarity scores.

In some aspects, determining the semantic similarity scores between the vector embeddings of the audio segment extracted from the received primary video stream and the audio segments extracted from the plurality of sources of the secondary video content may include using a transformer-based model that may include multiple encoding and decoding layers to generate deep semantic analysis, and determining the semantic similarity scores based on the generated deep semantic analysis. In some aspects, using the transformer-based model that may include multiple encoding and decoding layers to generate the deep semantic analysis may include using the transformer-based model to evaluate contextual and semantic relationships between the textual data derived from the primary and secondary content by using the speech recognition technology to transcribe the spoken words from the audio segment extracted from the received primary video stream and the audio segments extracted from the plurality of sources of the secondary video. In some aspects, using the transformer-based model that may include multiple encoding and decoding layers to generate the deep semantic analysis may include using the transformer-based model to evaluate thematic and linguistic characteristics of the textual data derived from the primary and secondary content by using the speech recognition technology to transcribe the spoken words from the audio segment extracted from the received primary video stream and the audio segments extracted from the plurality of sources of the secondary video.

Further aspects include a computing device including a memory and a processing system (at least one processor) having at least one processor configured to perform operations of any of the methods summarized above. Further aspects include a non-transitory processor-readable storage medium having stored thereon processor-executable software instructions configured to cause a processor to perform operations of any of the methods summarized above. Further aspects include a computing device having means for performing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
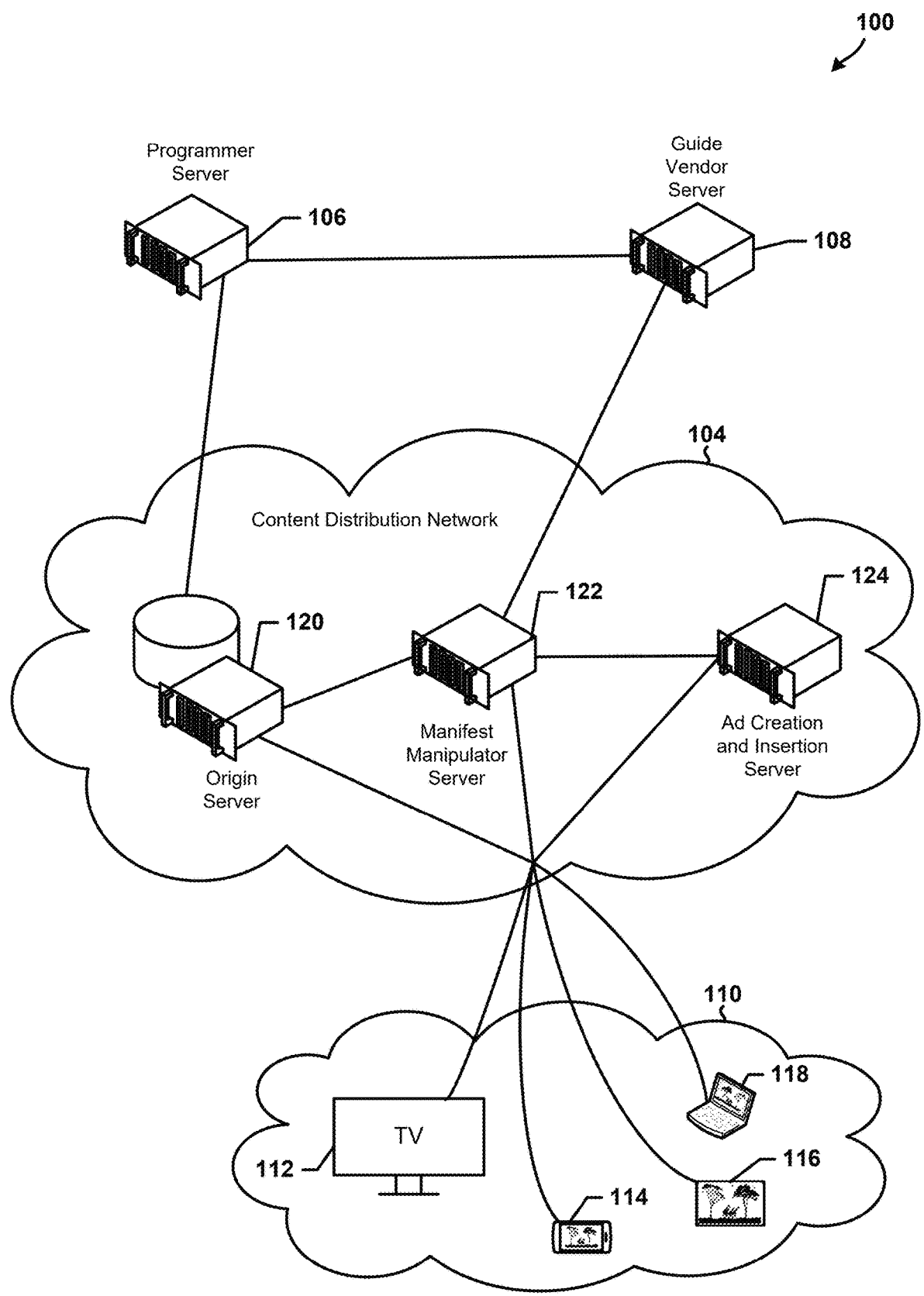
FIG. 1 is a component block diagram illustrating an example content distribution system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

In overview, the various embodiments include a method for selecting and inserting contextually relevant advertisements into a video stream, executed by a processing system in a network server computing device, that includes receiving a primary video stream with potential advertisement insertion points indicated by SCTE35/SCTE104 markers, extracting an audio segment from this stream before an advertisement break, obtaining audio from potential advertisements, transcribing both primary and secondary audio segments into textual data with a transformer based Encode-Decoder for automatic speech recognition, performing semantic analysis and tokenization on this data, creating vector embeddings, tensors embeddings dimension reduction, and normalizing the embeddings for a feed-forward neural network. The method may also include determining semantic similarity scores between the primary and secondary content through a transformer-based AI model, generating a similarity matrix from these scores, identifying the most contextually aligned advertisement based on these scores, and inserting this advertisement at an indicated break point in the primary video stream.

The embodiments may improve the performance and functionality of content delivery networks and advertisement (ad) systems (e.g., ad servers, etc.) by enhancing the contextual relevance of advertisements within a video stream. The embodiments may use advanced speech recognition and semantic analysis technologies to identify the most thematically appropriate advertisements for insertion and tailor the viewing experience to the individual consumer by aligning ads with the subject matter content. As such, the embodiments may increase viewer engagement and the effectiveness of the advertisements (ad effectiveness). Further, by using LLMs for semantic analysis and sophisticated artificial intelligence (AI) models and machine learning (ML) techniques to calculate similarity scores, the embodiments may insert advertisements that resonate with the ongoing primary video content and/or to maintain the continuity and cohesiveness of the viewing experience. The embodiments may also streamline the ad selection workflow and provide a more efficient and scalable approach to targeted advertising in live and VoD streaming services.

The term "service provider network" may be used generically herein to refer to any network suitable for providing consumers with access to the Internet or IP services over broadband connections and may encompass both wired and wireless networks/technologies. Examples of wired network technologies and networks that may be included within a service provider network include active Ethernet networks, asymmetric digital subscriber line (ADSL) technologies, cable networks, data over cable service interface specification (DOCSIS) networks, enhanced ADSL (ADSL2+), Ethernet, fiber optic networks, fiber-to-the-x (FTTx) technologies, hybrid-fiber-cable (HFC) networks, local area networks (LAN), metropolitan area networks (MAN), passive optical networks (PON), satellite networks, wide area networks (WAN), 10 Gigabit Symmetrical Passive Optical Network (XGS-PON), etc. Examples of wireless network technologies and networks that may be included within a service provider network include third generation wireless mobile communication technology (3G), third generation partnership project (3GPP), 3GSM, fourth generation wireless mobile communication technology (4G), fifth generation wireless mobile communication technology (5G), sixth-generation wireless (6G), advanced mobile phone system (AMPS), Bluetooth®, CDMA systems (e.g., cdmaOne, CDMA2000), digital enhanced cordless telecommunications (DECT), digital AMPS (IS-136/TDMA), enhanced data rates for GSM evolution (EDGE), evolution-data optimized (EV-DO), general packet radio service (GPRS), global system for mobile communications (GSM), high-speed downlink packet access (HSDPA), integrated digital enhanced network (iDEN), land mobile radio (LMR), long term evolution (LTE) systems, low earth orbit (LEO) satellite internet technologies, massive multiple input multiple output (MIMO), millimeter-wave (mmWave) technologies for higher-speed wireless communication, new radio (NR), next-generation wireless systems (NGWS), universal mobile telecommunications system (UMTS), Wi-Fi 7 (802.11be), Wi-Fi Protected Access I & II (WPA, WPA2), wireless local area network (WLAN), worldwide interoperability for microwave access (WiMAX), etc. Each of these wired and wireless technologies discussed herein includes the transmission and reception of data, as well as the exchange of signaling and content messages. It should be understood that, while specific technologies and standards are described herein to exemplify the range of capabilities associated with a service provider network, these references and details are included to serve merely as illustrative examples. These references should not be construed as narrowing the scope of the claims to any particular communication system or technology unless specifically recited in the claim language.

The terms "computing device," "user device," and "user equipment" (UE) may be used interchangeably herein to refer to any of a wide variety of electronic devices capable of executing programmed instructions. These devices include smartphones, advanced cellular telephones, smart televisions, interactive voice-controlled assistants, contemporary digital video recorders (DVRs), smartwatches, residential and bridged gateways, laptops, tablets, satellite or cable set-top boxes (STBs), portable multimedia players, network-connected storage and gaming solutions, wearable fitness trackers, home automation interfaces, and other similar devices equipped with processors, memory, and/or integrated circuitry to facilitate the functionalities described herein. Modern computing devices typically support connectivity to various networks through modems, routers, and network switches, including advancements such as 5G-enabled smartphones and tablets, home IoT (Internet of Things) hubs, and ultra-high-definition streaming media devices.

The terms "component," "module," "system," "engine," and the like are used in this application to refer to various computer-related entities tasked with specific operational functions. These may include hardware components, software programs, combinations thereof, or processes in execution. For example, a component may be a software application executing on a device, a processor executing instructions, a thread of a program, or the device itself. Components may operate individually within a single processing environment or may be distributed across multiple processing units to utilize the capabilities of multicore or parallel computing architectures. Components may execute instructions stored on different types of non-transitory computer-readable media and communicate via local or remote process interactions, inter-process communications, electronic signaling, data packet transfers, and other established protocols for data exchange and function coordination.

The term "processing system" may be used herein to refer to one or more processors, including multi-core processors, that are organized and configured to perform various computing functions. Various embodiment methods may be implemented in one or more of multiple processors within a processing system as described herein.

The term "system on chip" (SoC) may be used herein to refer to a single integrated circuit (IC) chip that contains multiple resources or independent processors integrated on a single substrate. A single SoC may contain circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system may also include software for controlling integrated resources and processors, as well as for controlling peripheral devices.

The term "system in a package" (SIP) may be used herein to refer to a single module or package that contains multiple resources, computational units, cores, or processors on two or more IC chips, substrates, or SoCs. For example, a SIP may include a single substrate on which multiple IC chips or semiconductor dies are stacked vertically. Similarly, the SIP may include one or more multi-chip modules (MCMs) on which multiple ICs or semiconductor dies are packaged into a unifying substrate. A SIP may also include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

For ease of reference, some embodiments are discussed with reference to broadcast. However, it should be understood that the term "broadcast" encompasses unicast and multicast, and nothing in this application should be interpreted as limiting to unicast, broadcast, or multicast express recited as such in the claims.

Seamlessly integrating content (e.g., advertisements, etc.) into media data streams is an important feature of modern broadcasting and media services. Service provider networks frequently use splicers to integrate content into media data streams. Splicers are specialized tools that insert content into media data streams at designated times. SCTE30, SCTE35, and SCTE104 are industry-standard protocols that enable precise and timely content insertion. SCTE30 is a digital program insertion standard that governs advertisement insertion messaging between splicers and servers and thus may be used for synchronized and interval-specific ad placements. SCTE35 governs signals for marking advertisement insertion points and thus may be used for correct content placement. SCTE104 identifies an IP-based interface for digital cueing messages and thus may be used to guide the precise insertion of digital content (e.g., advertisements, etc.) by communicating between broadcast equipment for digital programs and local ad insertion.

The term "SCTE30" may be used herein to refer to a digital program insertion standard used within the broadcasting and media industry. SCTE30 may govern the message exchanges for advertisement insertion opportunities within a media stream. Specifically, SCTE30 cue request messages may be sent from splicing devices to an advertisement insertion server, conveying information about the precise timing and placement of ads within the programming content. These messages may facilitate the automated synchronization of advertisement insertion across various devices and platforms and/or help ensure that advertisements are embedded at designated intervals within the media stream.

The term "SCTE35" may be used herein to refer to a standard used within the broadcasting and media industry to specify signaling for indicating the insertion points for local content, such as advertisements within a media stream. The SCTE35 standard outlines the cues for the start and end of media segments and allows for accurate placement of content by splicers and other related devices.

The term "SCTE104" may be used herein to refer to a standard specifying an interface for delivering digital cueing messages over Internet protocol (IP) networks within the broadcasting and media industry. SCTE104 defines the protocol for digital cue messages that instructs downstream equipment on the handling of the events signals for digital program insertion and local ad insertion in a digital broadcast stream. SCTE104 messages may be used to communicate between broadcast equipment, such as content servers and ad insertion equipment. As such, SCTE104 may be used for the preparation and insertion of digital content, including advertisements, into a media stream at precise, predefined points.

The phrase "SCTE35/SCTE104 marker" may be used herein to refer to standardized digital signals used to denote precise points for ad insertion or content segmentation in video streams. These markers may allow automated systems to identify suitable locations for inserting advertisements or transitioning between segments.

The terms "machine learning algorithm," "artificial intelligence model" and the like may be used herein to refer to any of a variety of information structures that may be used by a computing device to perform a computation or evaluate a specific condition, feature, factor, dataset, or behavior on a device. Examples of machine learning (ML) algorithms include network models, neural network models, inference models, neuron models, classifiers, random forest models, spiking neural network (SNN) models, convolutional neural network (CNN) models, recurrent neural network (RNN) models, deep neural network (DNN) models, generative network models, ensemble networks, generative adversarial networks, and genetic algorithm models. In some embodiments, a machine learning algorithm may include an architectural definition (e.g., the neural network architecture, etc.) and one or more weights (e.g., neural network weights, etc.).

The term "neural network" may be used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined or adjusted. As an example, the training process may include causing the neural network to process a task for which an expected/desired output is known, comparing the activations generated by the neural network to the expected/desired output, and determining the values of the weights in each layer based on the comparison results. After completion of the training process, the neural network may begin "inference" to process a new task with the determined weights.

The term "inference" may be used herein to refer to a process performed at runtime or during the execution of the software application program corresponding to the neural network. Inference may include traversing the neurons in various layers in the neural network along a forward path with pre-trained weights and activation functions, to produce one or more values in the final output layer, or as an overall activation or overall "inference result."

The term "feed-forward neural network" may be used herein to refer to a neural network in which connections between the neurons do not form a cycle. As such, feed-forward neural networks have a relatively simple and straightforward architecture. The straightforward architecture of feed-forward neural networks allows them to map input data to output data through one or more hidden layers, each composed of nodes that perform weighted computations on their inputs.

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit that cuts off activations below zero, etc.) between the layers. The first layer of nodes of a deep neural network may be referred to as an input layer. The final layer of nodes may be referred to as an output layer. The layers in between the input and final layer may be referred to as intermediate layers, hidden layers, or black-box layers.

Each layer in a neural network may have multiple inputs and, thus, multiple previous or preceding layers. Said another way, multiple layers may feed into a single layer. For ease of reference, some of the embodiments are described with reference to a single input or single preceding layer. However, it should be understood that the operations disclosed and described in this application may be applied to each of multiple inputs to a layer and multiple preceding layers.

The term "transformer" may be used herein to refer to a specific type of neural network that includes an encoder and/or a decoder and is particularly well-suited for sequence data processing. Transformers may use multiple self-attention components to process input data in parallel rather than sequentially. The self-attention components may be configured to weigh different parts of an input sequence when producing an output sequence. Unlike solutions that focus on the relationship between elements in two different sequences, self-attention components may operate on a single input sequence. The self-attention components may compute a weighted sum of all positions in the input sequence for each position, which may allow the model to consider other parts of the sequence when encoding each element. This may offer advantages in tasks that benefit from understanding the contextual relationships between elements in a sequence, such as sentence completion, translation, and summarization. The weights may be learned during the training phase, allowing the model to focus on the most contextually relevant parts of the input for the current task. Transformers often serve as foundational elements in constructing large generative AI models due to their specialized architecture for handling sequence data and capacity for parallel computation.

The term "large generative AI model" (LXM) may be used herein to refer to an advanced computational framework that includes any of a variety of specialized AI models including, but not limited to, large language models (LLMs), large speech models (LSMs), large vision models (LVMs), hybrid models, multi-modal models, etc. An LXM may include multiple layers of neural networks with billions or trillions of parameters. Unlike traditional systems that translate user prompts into a series of correlated files or web pages for navigation, LXMs support dialogic interactions and encapsulate expansive knowledge in an internal structure. As a result, rather than merely serving a list of relevant websites, LXMs are capable of providing direct answers and/or are otherwise adept at various tasks, such as text summarization, translation, complex question-answering, conversational agents, etc. LXMs may operate independently as standalone units, may be integrated into more comprehensive systems and/or into other computational units (e.g., those found in a SoC or SIP, etc.), and/or may interface with specialized hardware accelerators to improve performance metrics such as latency and throughput. In some embodiments, the LXM component may be enhanced with or configured to perform an adaptive algorithm that allows the LXM to, for example, better understand audio context information or better evaluate weights of connections between nodes in a feature graph, etc. In some embodiments, the LXM component may configured to understand, interpret, and generate human-like responses based on the input textual data and/or perform semantic analysis. These and other operations of the LXM may be performed by the same processing system that implements the functions of the various embodiments, may be distributed across multiple independent processing systems, or may be performed in the cloud or on a remote server.

The term "token" may be used herein to refer to a unit of information that a generative AI model (e.g., LLM, etc.) may read as a single input during training and inference. Tokens may represent a wide array of data types, including textual elements (e.g., paragraph, sentence, clause, word, sub-word, character, etc.), and depending on the LLM (e.g., BERT, LLaMa, GPT, etc.), auditory features (e.g., a phoneme, spectrogram, temporal dependency, Mel-frequency cepstral coefficients (MFCCs) that represent small segments of an audio waveform, etc.) and/or visual components (e.g., pixel blocks, image segments, etc.).

The term "tokenized data" may be used herein to refer to the collective result of breaking down complex information into tokens. In some embodiments, tokenized data may include a vector or an information structure that presents tokens in a formatted, organized, and structured format for analysis or processing by AI models. Said another way, tokenized data may present the outcome of a tokenization process in which complex textual, auditory, and/or visual information are broken down into manageable, discrete units (i.e., tokens) and then combined in a formatted, organized, and structured format for analysis or processing by AI models.

The term "embedding layer" may be used herein to refer to a lookup table to get token IDs from the learned tokens and map them to a fixed-size vector according to the pre-learned embeddings. In some aspects, the embedding layer may be viewed as a specialized layer associated with a neural network that converts tokens into high-dimensional vector spaces. An embedding layer may also transform high-dimensional data into low-dimensional vectors (e.g., using "dimensionality reduction" techniques, etc.). This is particularly useful when the original data is complex or too large to handle efficiently. The embedding layer may also convert tokens (typically low-dimensional entities) into high-dimensional vectors. An embedding layer may operate as a lookup table in which each unique token or category is mapped to a point in a continuous vector space. The vectors may be refined during the model's training phase to encapsulate the characteristics or attributes of the tokens in a manner conducive to the tasks the model is configured to perform.

The embedding layer may be configured to convert each token into a numerical vector. Each vector component (e.g., numerical value, parameter, etc.) may encode an attribute, quality, or characteristic of the original token. The vector components may be adjustable parameters that are iteratively refined during the model training phase to improve the model's performance during subsequent operational phases. The numerical vectors may be high-dimensional space vectors (e.g., containing 3000 or more dimensions depending on the known tokens from the text corpora used for the training) in which each dimension in the vector captures a unique attribute, quality, or characteristic of the token. For example, dimension 1 of the numerical vector may encode the frequency of a word's occurrence in a corpus of data, dimension 2 may represent the pitch or intensity of the sound of the word at its utterance, dimension 3 may represent the sentiment value of the word, etc. Such representation in high-dimensional space may help the LXM understand the semantic and syntactic subtleties of its inputs. During the operational phase, the tokens may be processed sequentially through layers of the LXM or neural network, which may include structures or networks appropriate for sequence data processing.

The term "operational phase" may be used herein to refer to a phase in which tokens (represented as vector embeddings) are processed through various layers of the AI model, including transformer architectures.

The term "vector embeddings" may be used herein to refer to continuous high-dimensional vectors and/or the transformation of tokens into high-dimensional vector representations within an embedding layer. Vector embeddings may encode tokens as continuous, high-dimensional vectors, with each dimension representing different linguistic features or contextual cues. The high-dimensional nature of vector embeddings supports a dense encapsulation of information, which in turn allows for a nuanced representation of each token that reflects its multifaceted relationships with other tokens within the dataset in a context-less and context-full relationship within the dataset and the input sequence. Some embodiments may be configured to generate and use vector embeddings to facilitate a more accurate comparison of semantic similarities. In some embodiments, the vector embeddings may capture both the semantic meaning and the context of the words or phrases in relation to a dataset. AI models may use the robust contextual representations of data encapsulated in vector embeddings to execute sophisticated tasks.

The term "speech recognition technology" may be used herein to refer to advanced computational systems and algorithms configured to convert spoken language into digital textual data. Such speech recognition technologies include various models and frameworks, including automatic speech recognition (ASR) LLM based systems, natural language processing (NLP) engines, and deep learning models such as convolutional neural networks (CNNs) and recurrent neural networks (RNNs), LSTM networks, etc. ASR systems may be configured to recognize and transcribe human speech into text with high accuracy, and they may be tailored to understand a variety of languages and dialects. NLP engines may go a step further by recognizing speech and understanding its context, allowing for more sophisticated interactions. Many deep learning models stand at the cutting edge of speech recognition by learning from extensive audio datasets to enhance their transcription accuracy over time. These speech recognition technologies may operate independently and/or be integrated into broader AI platforms that include robust frameworks for embedding speech recognition across various systems, components, or applications ranging from user interfaces that accept voice commands to systems designed for in-depth semantic analysis. Some embodiments may use speech recognition technologies to implement contextually relevant advertisement insertion, such as by transcribing audio content from media streams to text with positional encoding (e.g., punctuation, Upper/lower case in words, etc.) and analyzing the text to determine the most fitting advertisements for insertion (e.g., based on semantic congruence, relevance, etc.).

The term "speech recognition model" may be used herein to refer to a computational system within the speech recognition technology framework that uses advanced AI models, algorithms, and/or techniques to convert spoken words into written text. Speech recognition models may be particularly adept at handling speech in various dialects, tones, and speeds. Some embodiments may include components configured to integrate speech recognition models into any of a variety of diverse applications and/or to support subsequent processes such as generating semantic analysis results that may be used for automated insertion of relevant advertisements into media streams.

The term "semantic analysis" may be used herein to refer to any group of operations that could be performed by a component or computing device to understand the meaning of information included in a segment. In some embodiments, the semantic analysis operations may include using speech recognition models and/or semantic analysis models to determine or identify various characteristics and nuances (e.g., sentiment, subject matter, relationships between concepts, etc.) in the language or spoken words included in a segment (e.g., text segment, voice segment, audio-video segment, etc.)

The term "semantic similarity score" may be used herein to refer to a value (or other metric) that identifies, characterizes, or represents the degree to which two segments are semantically related and/or which otherwise provides a quantitative basis for characterizing the similarities between two or more segments. In some embodiments, the semantic similarity score may be included in (or may be) a matrix with many scores between the various embeddings (from texts from audio from Ad and video) against each other.

The term "similarity evaluation" may be used herein to refer to any group of operations that could be performed by a component or computing device to generate semantic similarity scores or evaluate the similarities between two or more segments (e.g., text segments, voice segments, image segments, etc.).

The term "similarity matrix" may be used herein to refer to an information structure (e.g., vector, table, matrix, etc.) that quantifies the similarity between entities or segments (e.g., text segments, voice segments, image segments, etc.).

The term "advertisement breakpoint" may be used herein to refer to designated points within a video stream or broadcast in which advertisements are inserted. In some embodiments, the advertisement breakpoints may be determined based on SCTE35/SCTE104 markers.

The term "advertisement" may be used herein to refer to any segment or unit of information (e.g., video, image, audio, text, etc.) that promotes or attempts to sell a product, service, idea, etc.

The various embodiments include computing devices that are equipped with components configured to insert contextually relevant advertisements into video streams. In some embodiments, the components may implement a multifaceted approach that includes integrating and using advanced speech recognition, LXMs, and semantic analysis to select and insert advertisements that are contextually and semantically aligned with the content preceding the advertisement break or breakpoint into a video stream (e.g., live broadcast, VOD, etc.).

In some embodiments, the components may be configured to receive a primary video stream (e.g., live broadcasts, VOD, etc.), actively monitor the stream for SCTE35/SCTE104 markers that indicate an advertisement breakpoint, determine a time window (e.g., 30 seconds, 1 minute, 2 minutes, 5 minutes, etc.) prior to the advertisement breakpoint for capturing contextual information, extract an audio segment from the primary video stream (primary audio segment) that is within the determined time window (i.e., to capture the contextual information preceding the advertisement breakpoint), and use a speech recognition model to transcribe the extracted audio segments into a text segment or textual data that provides a textual basis for further semantic analysis and/or which may be used to interpret the sounds included in the primary video stream more accurately. The components may use an LXM to perform semantic analysis operations on the text segment, tokenize the text segment into tokens or semantically coherent units, generate vector embeddings based on the tokens, and normalize the vector embeddings to align with the input specifications of a feed-forward neural network and/or otherwise prepare vector embeddings for similarity scoring or similarity evaluation operations.

The components may obtain potential advertisements or video segments from secondary content sources, extract audio segments (secondary audio segments) from the obtained advertisements or video segments, use a speech recognition model to transcribe the extracted secondary audio segments into secondary text segments, use the secondary text segments to perform semantic analysis operations (e.g., using an LXM, etc.), tokenize the secondary text segment into tokens, generate vector embeddings based on the tokens, and normalize the vector embeddings to align with the input specifications of the feed-forward neural network and/or otherwise prepare vector embeddings for the similarity scoring or similarity evaluation operations.

In some embodiments, the components may perform similarity scoring operations, which may include using a feed-forward neural network and/or other AI models to quantitatively evaluate the similarities between the primary audio segment and each of the secondary audio segments and assigning a semantic similarity score (e.g., a numerical value, etc.) to each pair of segments based on their level of similarity.

The components may generate a similarity matrix based on the semantic similarity scores, use the generated similarity matrix to determine the degree to which each of the secondary audio segments is semantically aligned with the primary audio segment and rank the secondary audio segments based on their semantic alignment. The components may select an advertisement for insertion into the primary video feed based on the rankings or semantic alignment and insert the selected advertisement into the primary video stream at the designated advertisement breakpoint. For example, in some embodiments, the components may select and insert the secondary video segment (advertisement) that is associated with the highest-ranking secondary audio segment. As such, the components may select the advertisement that is most contextually relevant to and semantically aligned with the content preceding the advertisement break.

In some embodiments, the components may be configured to collect and use feedback and viewer engagement data, refine and improve the AI models, and repeat the above-described operations each advertisement break in the primary video stream.

In some embodiments, the components may be configured to generate and use the semantic similarity scores to evaluate the alignment of themes, concepts, or contexts of the text segments (which may include a transcription of spoken words from an audio segment extracted from a primary video stream and a transcription of spoken words from an audio segment extracted from a secondary video stream).

In some embodiments, the components may evaluate the alignment of themes, concepts, or contexts of the text segments by analyzing the vector embeddings associated with each text segment. Each vector embedding may include multiple dimensions, and each dimension may characterize a different semantic feature/attribute (or different aspect of the feature/attribute) of the content included in the text segment.

In some embodiments, the components may apply the vector embeddings to an AI model that evaluates the similarities and differences in the dimensions of the vector embeddings and generates a score (e.g., a numeric value, etc.) that quantifies the semantic relationship. A high score may indicate a strong semantic correlation (e.g., may indicate that the texts have similar meanings, discuss related topics with similar or overlapping contexts, etc.). On the other hand, a low score may indicate a weak (or no) semantic correlation between the text segments (e.g., the text segments include divergent themes or contexts, etc.).

Thus, the embodiments include methods, and computing devices configured to implement the methods, of inserting contextually relevant advertisements into a video stream. In some embodiments, the methods may include receiving a primary video stream that includes live or video-on-demand (VoD) content with embedded SCTE35/SCTE104 markers indicating potential advertisement insertion points, extracting an audio segment from the primary video stream (e.g., 1-2 minutes prior to a designated advertisement break, etc.) in response to detecting an SCTE35/SCTE104 marker, extracting audio segments from one or more sources of secondary video content that include potential advertisements for insertion into the primary video stream, using one or more speech recognition technologies to transcribe spoken words from the audio segment extracted from the primary video stream and the audio segments extracted from the secondary content into textual data, using the textual data to query a Large Language Model (LLM) or a large generative artificial intelligence model (LXM) to perform semantic analysis and tokenize the analyzed textual data into sentences or semantically coherent units.

In some embodiments, the method may further include transforming the tokenized data into vector embeddings, normalizing the vector embeddings to conform to the input specifications of a feed-forward neural network, and determining semantic similarity scores between the vector embeddings of the audio segment extracted from the primary video stream (primary audio segments) and the audio segments extracted from the secondary content (secondary audio segments). In some embodiments, the method may further include generating a similarity matrix based on the determined semantic scores, using the similarity matrix to identify an advertisement in the secondary content that has the highest semantic similarity score in relation to the audio segment extracted from the primary video stream, and inserting the identified advertisement into the primary video stream at the advertisement breakpoint indicated by the SCTE35/SCTE104 markers.

FIG. 1 illustrates components in a video delivery system 100 that could be used to implement some embodiments. In the example illustrated in FIG. 1, the video delivery system 100 includes content rendering devices 102, a content distribution network (CDN) 104, programmer servers 106, and guide vendor servers 108. The content rendering devices 102 includes televisions 112, smartphones 114, tablets 116, computers 118, and other similar devices. The CDN 104 includes an origin server 120, a manifest manipulator server 122, and an ad creation and insertion server 124. Any or all of the above components may be connected via one or more wired and/or wireless connections, such as connections to wired and/or wireless networks (e.g., connections to the Internet).

While not illustrated or numbered separately in FIG. 1, it should be understood that in some embodiments, the video delivery system 100 may include, may be included in, and/or may use the services, infrastructure, and capabilities of a service provider network. For example, in some embodiments, the video delivery system 100 may use information available from the service provider (e.g., network data, user location, network usage patterns, bandwidth capabilities, etc.) to determine context and/or to further enhance the contextual relevance of the advertisements that are inserted into a video stream. In some embodiments, the video delivery system 100 may use information from the service provider network to select advertisements that are semantically similar to the content and/or tailored to viewer context and viewing conditions. In addition, the service provider network may include or support a wide range of wired and wireless technologies so that users may receive video streams and advertisements regardless of their network infrastructure.

With reference to FIG. 1, the CDN 104 may be configured to deliver streaming video content to the content rendering devices 110. The CDN 104 may be operated by a content distributor (e.g., Charter®, Comcast®, DirecTV®, Sling® TV, etc.) and/or may offer video streaming services using internet protocol (IP) streaming technologies, such as Adaptive Bitrate (ABR) streaming formats such as Apple HLS and DASH.

The programmer servers 106 may be configured to operate as the primary source of video content within the video delivery system 100. The programmer servers 106 may host and manage a library of video content (e.g., television shows, movies, live broadcasts, etc.) from various content creators and networks (e.g., Turner Broadcasting®, ESPN®, Disney®, Viacom®, etc.). The programmer servers 106 may also be responsible for encoding video content into formats suitable for streaming over the CDN 104. In addition, programmer servers 106 may be configured to dynamically adjust the streaming quality of the video content based on real-time network conditions.

The guide vendor servers 108 may be configured to aggregate and disseminate programming information and content recommendations across the video delivery system 100. The guide vendor servers 108 may collect schedules, metadata, and other relevant information from multiple programmer servers 106 and compile this information into an accessible electronic program guide (EPG). The guide vendor servers 108 may use algorithms to curate and recommend content to viewers based on their viewing habits, preferences, and search queries. The guide vendor servers 108 may also be configured to facilitate the integration of interactive advertising and promotional content within the EPG.

The origin server 120 may be configured to receive and store encoded video streams from programmer servers 106 and/or to otherwise operate as the central repository for all video content within the CDN 104. The origin server 120 may be configured to efficiently manage and distribute large volumes of data to facilitate rapid access to content by other components within the CDN 104.

The manifest manipulator server 122 may be configured to generate and modify manifest files for streaming media. The manifest files may include metadata about the video content, including information about different available segments, bitrates, and resolutions. The manifest manipulator server 122 may be configured to dynamically adjust the manifest files based on factors such as user device capabilities, network conditions, and content licensing agreements. In some embodiments, the manifest manipulator server 122 may be configured to insert markers (e.g., SCTE35/SCTE104 markers, etc.) for advertisement breakpoints.

The ad creation and insertion server 124 may be configured to manage and facilitate the integration of advertisements into video streams, collaborate with advertisers to create and curate a repository of advertisements that are relevant and engaging to the viewers and select and insert advertisements into the video stream in real-time (e.g., generate targeted ads based on viewer demographics, interests, viewing history, etc.). The ad creation and insertion server 124 may support various ad formats, including pre-roll, mid-roll, and post-roll ads, as well as interactive and overlay ads. In some embodiments, the ad creation and insertion server 124 may be configured to provide analytics and reporting tools for advertisers to measure advertisement performance and viewer engagement.

In some embodiments, the ad creation and insertion server 124 may be configured to generate advertisements for products or brands that match or are consistent with the context, content, and/or storyline of a video stream before delivery to content rendering devices 110. In some embodiments, the ad creation and insertion server 124 may include one or more trained artificial intelligence (AI) models as part of its programming or integrated processors, including image-to-text generative AI model, LXM, text-to-video generative AI model, etc. In some embodiments, the ad creation and insertion server 124 may be configured to access the AI models via an application programming interface (API) (e.g., by generating and sending queries to a remote server, etc.).

Figure 2:
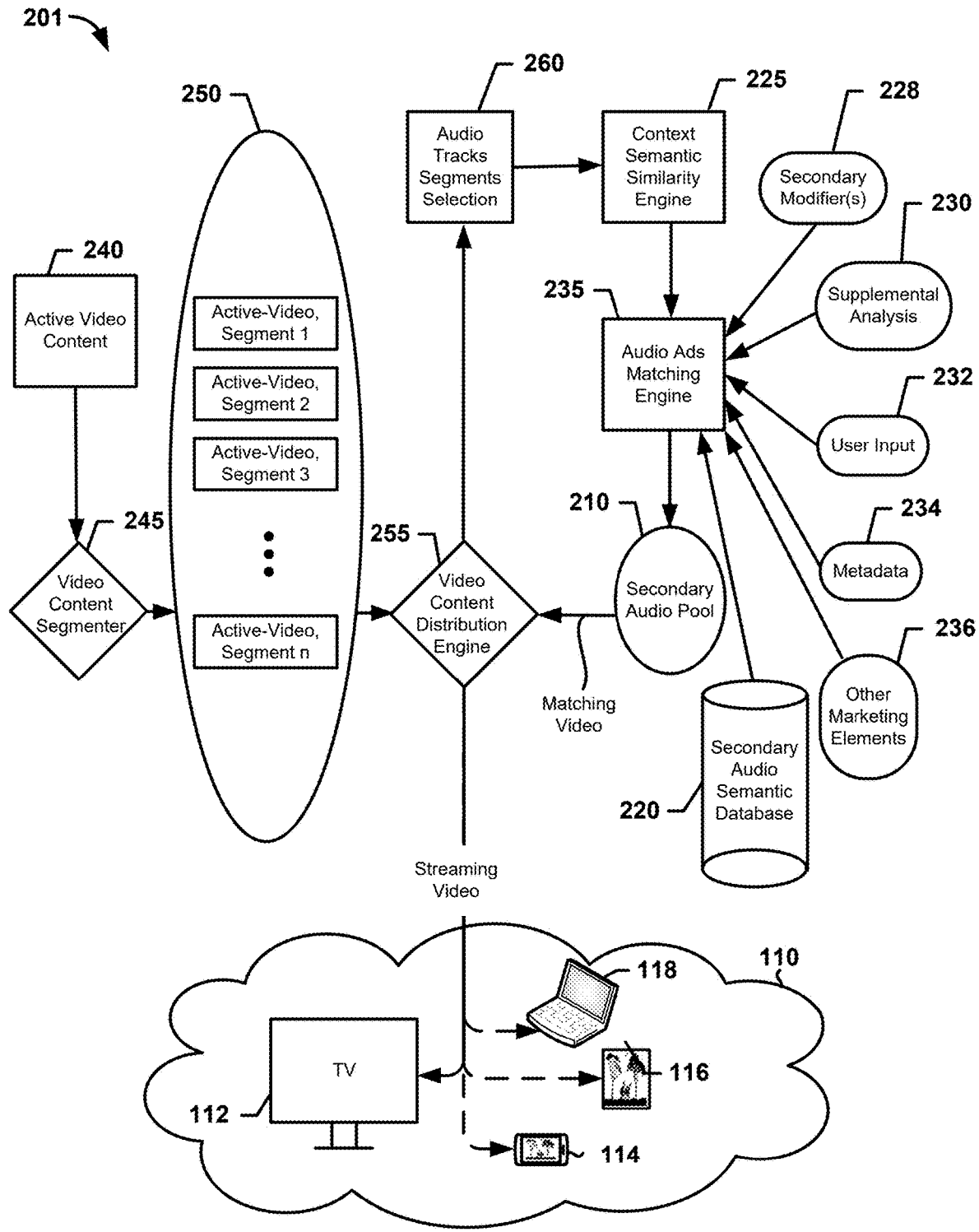
FIG. 2 is a component block diagram illustrating an example software architecture a software system that includes a video content distribution engine configured to control the delivery of video content to a target consumer via content rendering devices in accordance with some embodiments.

FIG. 2 illustrates an example architecture of a software system 201 that includes a video content distribution engine configured to control the delivery of video content to a target consumer via content rendering devices 110. In the example illustrated in FIG. 2, the software system 201 includes a secondary audio pool 210 component, a secondary audio semantic database 220 component, a context semantic similarity engine 225, a secondary modifier(s) 228 component, a supplemental analysis 230 component, a user input 232 component, a metadata 234 component, an audio ads matching engine 235, other marketing elements 236 components, an active video content 240 component, a video content segmenter 245 component, a segments 250 component, a video content distribution engine 255, and an audio tracks segments selection 260 component.

A computing system (e.g., the origin server 120, the ad creation and insertion server 124, etc.) may implement the software system 201 to deliver primary and secondary video content. Within the illustrated software system 201 architecture, layers may establish logical connections with equivalent layers in the computing system software and/or the software system 201 itself may be distributed across several processors. Although a single component (e.g., context semantic similarity engine 225, etc.) may be shown for ease of reference, it should be understood that multiple instances of these components may be integrated into the software system 201 architecture and each component may be associated with distinct computing devices. It should also be understood that, in some embodiments, one or more the components may be distributed and/or configured to facilitate parallel processing and/or enhanced system efficiency.

With reference to FIGS. 1 and 2, the secondary audio pool 210 may operate as a repository that includes a wide-ranging and/or detailed collection of audio tracks sourced from a wide variety of diverse advertisements (e.g., audio-video advertisements, etc.) or advertisement servers. In some embodiments, the secondary audio pool 210 may categorize the audio ads based on content, context, tone, emotional impact, and other similar criteria. Such categorization may allow the system to quickly and efficiently match audio ads to the thematic and semantic properties of the primary video content.

The secondary audio semantic database 220 component may be configured to store, organize, and manage the results of the semantic analyses of the categorized audio tracks stored in the secondary audio pool 210. The secondary audio semantic database 220 may index key attributes, themes, and semantic tags associated with each audio track. Such indexing may allow the system to quickly retrieve and compare information to identify audio ads that closely align with the context and themes of the primary video content (e.g., to identify audio ads that have a high probability of contextual and thematic congruence with the primary video content, etc.).

The context semantic similarity engine 225 may be configured to use advanced NLP, LXMs, machine learning algorithms, and/or AI models to analyze and evaluate semantic similarities or correlations between the audio tracks of the primary video and the audio tracks within the secondary audio pool 210. In some embodiments, the context semantic similarity engine 225 may be configured to generate similarity scores based on thematic relevance, contextual alignment, emotional resonance, etc. In some embodiments, the context semantic similarity engine 225 may be configured to use transformer-based models to evaluate nuanced characteristics of speech (e.g., tone, intent, subject matter, etc.) and/or to compare these characteristics across the primary and secondary audio tracks/segments. The context semantic similarity engine 225 may compare these elements across the primary and secondary audio tracks/segments to, for example, allow for the dynamic insertion of contextually cohesive and mood-enhancing audio ads.

The secondary modifier(s) 228 component may be configured to apply additional filters and criteria to refine the selection of audio ads from the secondary audio pool 210. For example, the secondary modifier(s) 228 may select the audio ads based on viewer demographics, content preferences, historical engagement data, and specific advertising objectives. In some embodiments, the secondary modifier(s) 228 may adjust various modifier weights to improve ad selection and enhance the accuracy of ad targeting.

The secondary modifier(s) 228 may be configured to enhance the ad selection by implementing or using another layer of advanced algorithms to filter and prioritize advertisements from the secondary audio pool 210. The secondary modifier(s) 228 may analyze and apply "ad relevance determinants" that include a series of sophisticated filters and criteria. For example, one or more ad relevance determinants may include a combination of audience demographics, content preferences, engagement history, and the specific objectives of the advertising campaign. The secondary modifier(s) 228 may analyze and use such determinants to identify the advertisements that are most likely to resonate with the target audience and/or otherwise improve the effectiveness of the ad placement. In some embodiments, the secondary modifier(s) 228 may be configured to use machine learning techniques to dynamically adjust the weights of the ad relevance determinants to account for their varying importance in different contexts or for different viewer segments. These dynamic adjustments may help provide a more tailored advertising strategy that meets the immediate goals of the advertising campaign and/or enhances viewer engagement through more relevant and appealing ad content.

The supplemental analysis 230 component may be configured to delve deeper into the nuances of content and context for both primary and secondary audio tracks/segments to generate more comprehensive insights that further improve the ad selection and placement operations. As part of these operations, the supplemental analysis 230 component may access and use any of a variety of information sources, including external data sources that provide broader context or industry trends, direct audience feedback (which may be used to characterize viewer preferences and reactions, etc.), and advanced analytics that provide details on viewer behavior and engagement patterns. The supplemental analysis 230 component may integrate these diverse data streams to improve ad selection and the accuracy of ad matching and targeting.

The user input 232 component may be configured to capture and integrate viewer feedback, preferences, and selections into the ad selection process. By allowing viewers to express their likes, dislikes, and content interests, the user input 232 component may improve the dataset used for matching ads. The improved dataset may, in turn, be used to insert more personalized and viewer-centric ads.

The metadata 234 component may be configured to organize descriptive data about primary and secondary audio content. This may include information related to content creators, genres, publication dates, and any other relevant descriptors. The metadata 234 may also be configured to provide highly accurate and efficient content categorization and retrieval to improve the speed, accuracy, and/or effectiveness of the matching operations.

The audio ads matching engine 235 may be configured to perform the final or definitive matching of primary video content and potential audio ads. The audio ads matching engine 235 may use the outputs from the context semantic similarity engine 225, secondary modifiers 228, supplemental analysis 230, and user inputs 232 to select the most contextually and semantically aligned audio ad for insertion. As such, the audio ads matching engine 235 may help provide a more tailored advertising strategy that meets the immediate goals of the advertising campaign and/or enhances viewer engagement through more relevant and appealing ad content.

The other marketing element 236 components may be configured to help create a comprehensive and tailored advertising strategy, such as by integrating a wide array of marketing tactics and strategies into the ad selection and insertion operations.

The active video content 240 and/or video content segmenter 245 components may be configured to manage and process the video content currently being streamed or viewed to improve the quality and continuity of the viewer experience.

The video content segmenter 245 component may be configured to segment active video content for analysis, ad insertion, and streaming. For example, it may segment the content to allow ads to be inserted at select points within the video stream without disrupting the narrative flow or viewer engagement. In some embodiments, these components may also be configured to analyze the segments and prepare them for seamless integration with selected audio ads.

The segment 250 component may be a repository configured to store and manage the individual segments created by the video content segmenter 245.

The video content distribution engine 255 may be configured to oversee the delivery of content, including primary content and selected audio ads, to the target consumer. For example, the video content distribution engine 255 may perform various operations to cause the system 201 to adapt to varying network conditions and viewer preferences and/or so that content is streamed efficiently and at the highest possible quality to the content rendering devices 110.

The audio tracks segment selection 260 component may be configured to identify and select specific segments of the primary video content for analysis by the context semantic similarity engine 225 and/or to otherwise provide that the ads inserted are highly relevant and complementary to the content being viewed. The selected segments may be used to determine the thematic and contextual basis for ad matching.

In accordance with various embodiments, active video content 240 may be received at a video content partitioner. The active video content 240 may be received from the content distributor network (e.g., 208), the remote computing device(s) (e.g., 210), and/or the external resources (e.g., 212). Depending upon the network elements available and the target consumer's viewing device(s), the target consumer's profiles, resolution, bit-rate, etc., may vary for optimization.

The video content segmenter 245 may divide the active video content 240 into smaller segments 250 (e.g., Active video, Segment 1; Active video, Segment 2; Active video, Segment 3; . . . Active video, Segment n), which may be stored in a video content cache (e.g., 218).

The video content distribution engine 255 may be configured to control the output of video content to the target consumer via the viewing device. Also, the video content distribution engine 255 may perform the functions of and/or may be synonymous with the video content distribution module. In this way, the video content distribution engine 255 may decide whether to stream segments of the active video content or interrupt the active video content and stream a select video from the secondary audio pool 210.

Using functions of the audio tracks segments selection module, the video content distribution engine 255 may recognize when a segment of the active video content is the last segment before an interruption in the active video content or the end of the active video content. The recognized last segment may be selected, as an audio tracks segments selection 260, for analysis by the context semantic similarity engine 225. The context semantic similarity engine 225 may perform the functions of and/or be synonymous with the semantic analysis module. After performing the semantic analysis on the audio tracks segments selection 260, the context semantic similarity engine 225 may convey the results to the audio ads matching engine 235. The audio ads matching engine 235 may compare the received results to matching scores from the secondary audio pool 210, which matching scores may be maintained in the secondary audio semantic database 220 to find a matching video from the secondary audio pool 210. In addition, the audio ads matching engine 235 may consider input from one or more of the secondary modifier(s) module (i.e., secondary modifier(s) 228), the supplemental video content analysis/storage module (i.e., supplemental analysis 230), the user input receiving/storage module (i.e., user input 232), the metadata consideration(s) receiving/storage module (i.e., metadata 234), and/or the other marketing elements module (i.e., other marketing elements 236) to find the matching video. Once determined, the matching video may be supplied to the video content distribution engine 255 for distribution as streaming video to the target consumer at one or more content rendering devices 110.

In this way, the video content distribution engine 255 may seamlessly present secondary video content to the target customer 5 (i.e., the viewer) as streaming video on the viewing device, during a brief interruption of the active primary video content, with the active primary video content resuming after the secondary video content is finished. The matching video used as the secondary video content will seem contextually relevant to the target consumer due to the similarity of key visual elements in both video content.

In other embodiments, the software system 201 may include one or more higher logical layer (e.g., transport, session, presentation, application, etc.) that provide host layer functions. For example, in some embodiments, the software System 201 may include a network layer (e.g., IP layer) in which a logical connection terminates at a packet data network (PDN) gateway (PGW). In some embodiments, the software System 201 may include an application layer in which a logical connection terminates at another device (e.g., end user device, server, etc.). In some embodiments, the software System 201 may include a hardware interface between a physical layer and communication hardware (e.g., one or more radio frequency (RF) transceivers).

Figure 3:
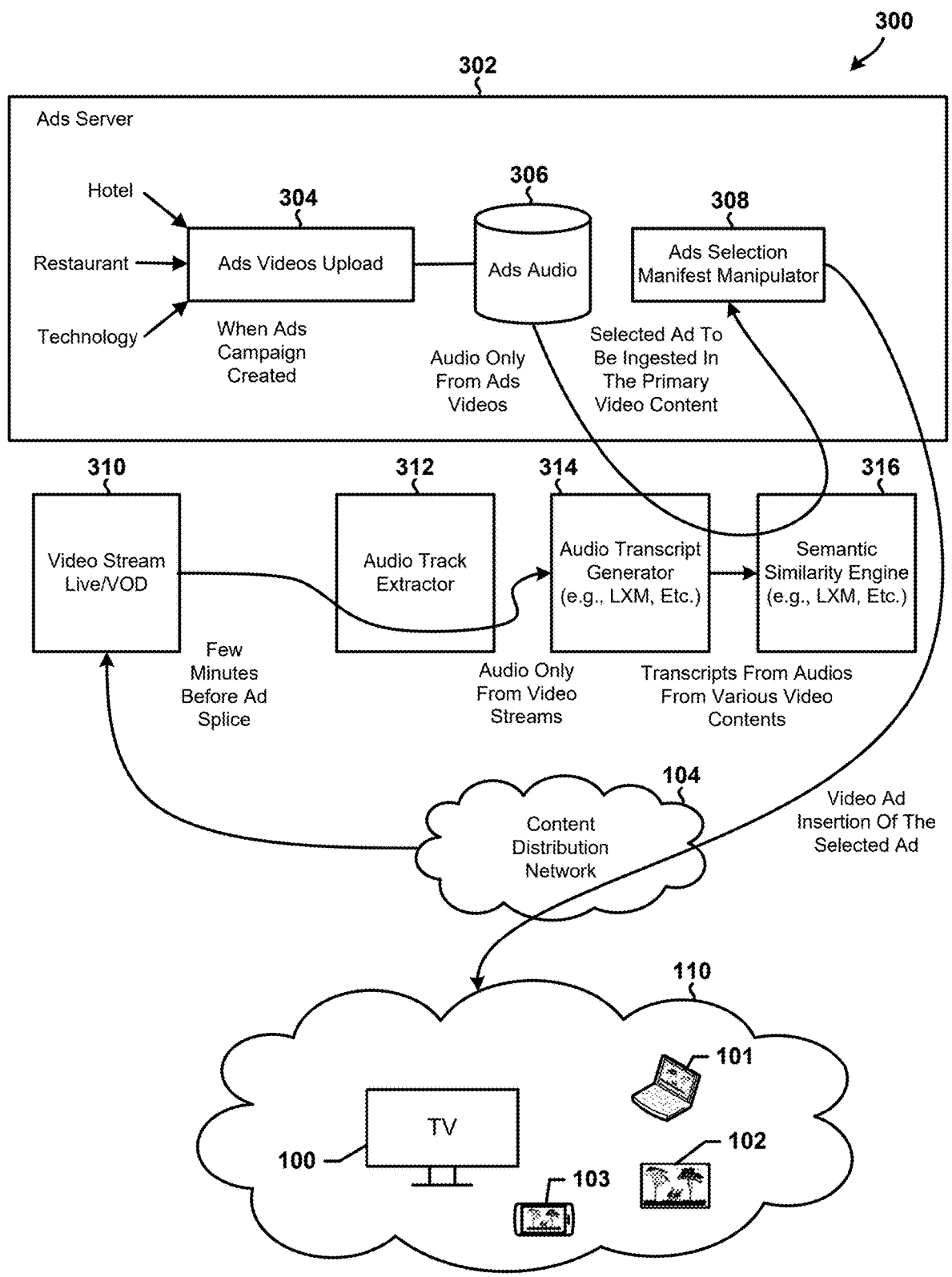
FIG. 3 is a component block diagram illustrating another example software architecture of a targeted advertising system that may be configured to manage and execute ad insertion operations and deliver advertisement content in conjunction with video streams in accordance with some embodiments.

FIG. 3 illustrates an example targeted advertising system 300 that may be configured to manage and execute ad insertion operations and/or the delivery of advertisement content in conjunction with video streams in accordance with some embodiments. In the example illustrated in FIG. 3, the system 300 includes an ads server 302, ads videos upload 304, an ads audio database 306, an ads selection manifest manipulator 308, a video stream interface 310, an audio track extractor 312, an audio transcript generator 314, and a semantic similarity engine 316.

The ads server 302 component may operate as a central hub for the intake of advertising content from diverse entities (e.g., hotels, restaurants, technology companies, etc.). The advertisements may be uploaded to the ads server 302 component when a campaign is launched to initiate the ad distribution process.

The ads videos upload 304 component may be configured to facilitate the uploading of video advertisements to the ads server 302 and/or otherwise allow advertisements or "ad content" to be provided by advertisers.

The ads audio database 306 component may be configured to store audio tracks extracted from the uploaded advertisement videos. As such, the ads audio database 306 may operate as a reservoir of audio content that may be matched with the semantic characteristics of video content (e.g., to provide thematic consistency in ad placement, etc.) in accordance with some embodiments.

The ads selection manifest manipulator 308 may be configured to select suitable ads to be inserted into the primary video content. The ads selection manifest manipulator 308 component may control the ad manifest and determine which ads to play based on predefined criteria (e.g., to achieve targeted advertising, etc.).

The video stream interface 310 component may be configured to provide the system with access to live or on-demand video streams. It may also receive and prepare active video content for subsequent ad splicing.

The audio track extractor 312 component may be configured to extract audio tracks from the video stream. In some embodiments, the audio track extractor 312 component may isolate the audio a few minutes before an anticipated advertisement breakpoint to allow for the thematic elements of the content to be analyzed and matched with appropriate ads.

The audio transcript generator 314 component may be configured to transcribe the extracted audio tracks into text for analysis. In some embodiments, the audio transcript generator 314 component may use LXMs to create transcripts from the audio content that may be used for semantic analysis of the video content.

The semantic similarity engine 316 component may be configured to analyze the transcripts generated by the audio transcript generator 314. The semantic similarity engine 316 component may examine the thematic and contextual elements of the content to determine the semantic similarity between the video content and available ads so that the most contextually relevant advertisements are selected.

The CDN 104 may be configured to handle the insertion of the selected ad into the video stream that is delivered to the end consumer.

Figure 4:
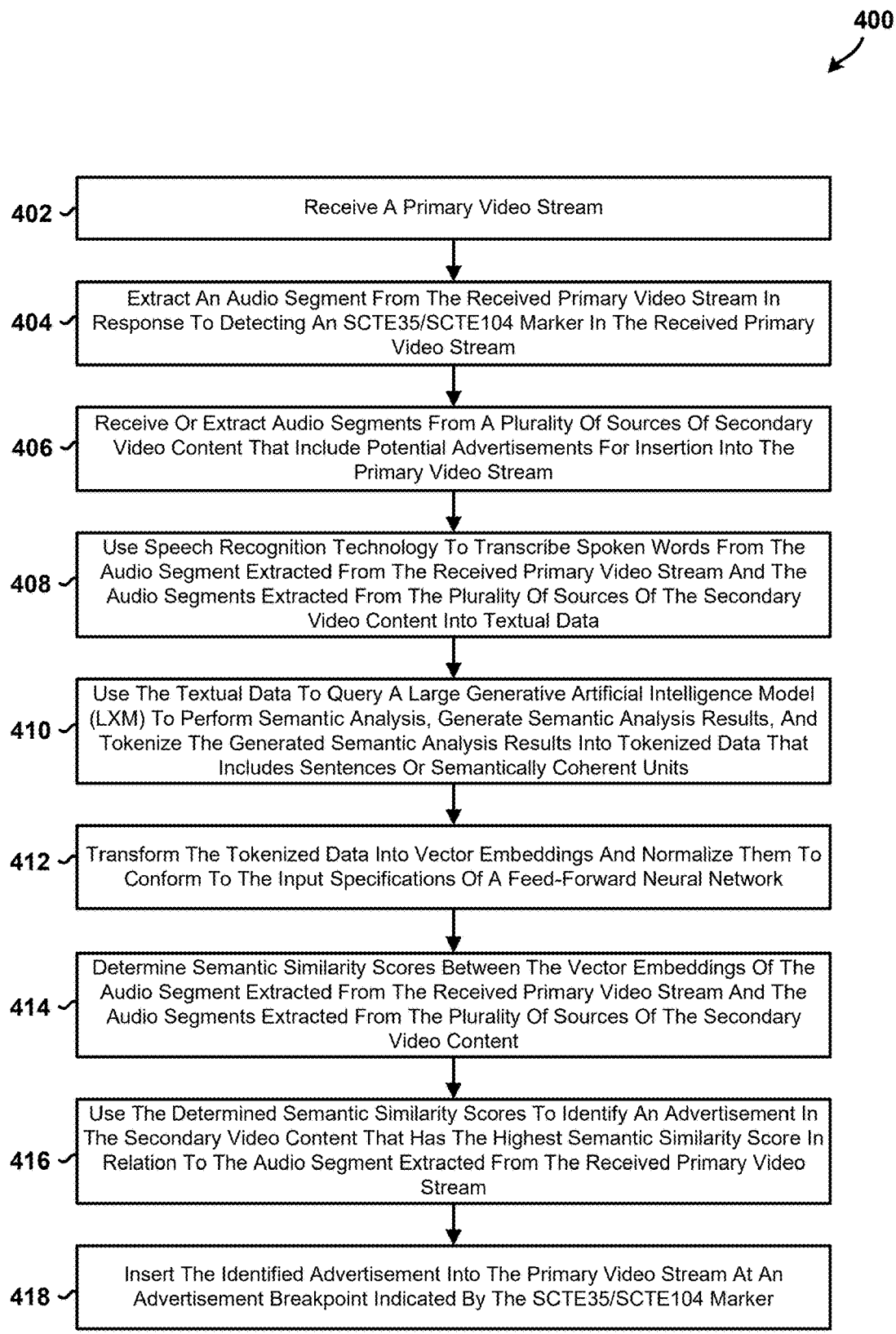
FIG. 4 is a process flow diagram illustrating a method of selecting and inserting contextually relevant advertisements into a video stream in accordance with the embodiments.

FIG. 4 illustrates a method 400 of selecting and inserting contextually relevant advertisements into a video stream in accordance with some embodiments. Method 400 may be performed by a processor or processing system in a network server computing device (the ads server 302 illustrated in FIG. 3, etc.).

In block 402, the processor may receive a primary video stream, such as an IP stream, live broadcast, or video-on-demand (VoD) content, that includes embedded SCTE35/SCTE104 markers indicating potential advertisement insertion points. These markers serve as digital cues integrated within the metadata associated with the stream that guide the system on where and when to insert advertisements seamlessly without disrupting the viewing experience. For example, during a live sports event broadcast, SCTE35 markers might be embedded to signal halftime or timeouts which are generally great moments for ad insertion. Similarly, in VoD content like a series episode, SCTE104 markers may indicate transitions between scenes or before cliffhanger moments in which viewers are likely to be engaged but receptive to a brief intermission for advertisements. These markers may allow the processing system to dynamically insert ads in real-time or align ad placement accurately during the pre-processing of content.

In block 404, the processing system may extract an audio segment from the received primary video stream in response to detecting an SCTE35/SCTE104 marker in the received primary video stream. For example, the processor may identify a SCTE35 marker signaling an upcoming commercial break during a live sports broadcast. Upon detection, the processing system may automatically extract the audio from the last minute leading up to this break to analyze the context and mood immediately before the advertisement insertion point so that subsequent advertisements are thematically and emotionally congruent with the preceding content. In a VoD scenario, if a SCTE104 marker indicates a transition between episodes of a drama series, the processor may extract audio from the concluding scenes of an episode. This allows for selecting advertisements that resonate with the emotional state or thematic elements presented. This may also enhance viewer engagement by providing a seamless content-to-advertisement transition that feels natural and less intrusive. In some embodiments, the processing system may extract the audio segment from the received primary video stream around one or two minutes before a designated advertisement break.

In block 406, the processor may receive or extract audio segments from a plurality of sources of secondary video content that include potential advertisements for insertion into the primary video stream. For example, the processor may access a library of advertisements stored on a CDN to select audio segments from various ads that span different industries (e.g., automotive, tech gadgets, fast food, etc.) to amass a diverse repository of advertisements from which the most contextually and semantically suitable advertisements may be chosen for insertion. By analyzing the audio content of these ads, the system may evaluate their thematic relevance, emotional tone, and specific messaging to ensure alignment with the content in the primary video stream. For example, after extracting an audio segment indicating a high-energy moment in a sports event, the system may prioritize ads with a similar energetic or triumphant tone (e.g., a new sports drink launch, an ad for athletic gear, etc.) to maintain viewer engagement and potentially increasing ad effectiveness by matching the mood of the advertisement with that of the preceding content.

In block 408, the processor may use speech recognition technology to transcribe spoken words from the audio segment extracted from the received primary video stream and the audio segments extracted from the plurality of sources of the secondary video content into textual data. For example, the processor may use ASR systems to convert the commentary and audience reactions during a live sports event into text for the primary stream. Concurrently, the processor may transcribe dialogues and voice-overs from various advertisement clips, such as a tech product tutorial or a fast-food commercial jingle, sourced from different advertisers. This transcription may be used to analyze and understand the content at a granular level and to allow the processor to evaluate thematic and emotional alignment between the primary video stream and potential advertisements. By converting these audio segments into text, the system may gain the ability to conduct semantic analysis, identifying key themes, sentiments, and specific language used in both the primary content and the ads. For example, if the atmosphere of a sports event is exhilarating and victorious, the system, through subsequent semantic analysis of the transcribed texts, may identify ads that share a similarly uplifting tone and select those most likely to maintain or enhance viewer engagement during ad breaks.

In block 410, the processing system may use the textual data to query an LXM to perform semantic analysis, generate semantic analysis results, and tokenize the generated semantic analysis results into tokenized data that includes sentences or semantically coherent units. For example, the processor may input the transcribed text from an intense debate in a news program and the persuasive speech from an insurance advertisement into an LXM. The LXM may use its vast knowledge base and linguistic understanding to evaluate the text and identify underlying themes, such as conflict resolution or safety assurance. The LXM may then break down the semantic analysis results into structured tokens that represent key concepts and sentiments. This tokenization may facilitate a detailed comparison of thematic elements and contextual alignment between the primary content and potential advertisements. For example, if the semantic analysis reveals a strong focus on security and reliability in both the debate and the insurance ad, the processor may these tokens to match the ad with the content segment so that the advertisement inserted is highly relevant and resonates with the viewers.

In block 412, the processing system may transform the tokenized data into vector embeddings and normalize them to conform to the input specifications of a feed-forward neural network. For example, the processor may convert tokenized phrases from a documentary on environmental conservation and similar themes extracted from potential green product advertisements into dense vector representations. These embeddings may encapsulate the semantic richness and contextual nuances of each token, assigning high-dimensional spatial attributes that reflect their linguistic and thematic significance within the dataset. The processor may normalize these vector embeddings to ensure uniformity in scale and distribution and to align them with the architectural requirements of a feed-forward neural network designed for semantic similarity assessment. This standardization is important for maintaining the integrity of the semantic analysis because it allows the neural network to efficiently process and compare the vectors to identify patterns and relationships that signify thematic congruence between the content in the documentary and the eco-friendly ads. For example, terms related to sustainability or ecological impact in both the documentary and the ads may be represented by vectors that closely align in the normalized vector space so that the system may accurately gauge and select advertisements that best match the message of the documentary.

In block 414, the processing system may determine semantic similarity scores between the vector embeddings of the audio segment extracted from the received primary video stream and the audio segments extracted from the plurality of sources of the secondary video content. For example, the processor may use algorithms that measure the distance or alignment between vector embeddings corresponding to a climactic scene in a drama series and various emotional advertisements, such as a heartfelt charity appeal or an exciting movie trailer. The processor may quantify the thematic and contextual resonance between the primary content and each advertisement by computing the cosine similarity (or another distance metric) between these high-dimensional vectors. A higher semantic similarity score may indicate a closer thematic or emotional match and/or more strongly suggest that the advertisement shares significant contextual or thematic elements with the climactic scene, such as heightened emotion or a pivotal narrative moment. Such precise quantification may allow the system to rank potential advertisements more accurately based on their relevance to the specific segment of the drama series. As such, the processor may select the advertisement that aligns closely with the current emotional tone or narrative arc of the content.

In some embodiments, in block 414, the processing system may use a transformer-based AI model that includes multiple encoding and decoding layers to generate deep semantic analysis and determine the semantic similarity scores based on the generated deep semantic analysis. In some embodiments, the processing system may use the transformer-based AI model to evaluate contextual and semantic relationships between the textual data derived from the primary and secondary content by using the speech recognition technology to transcribe the spoken words from the audio segment extracted from the received primary video stream and the audio segments extracted from the plurality of sources of the secondary video. In some embodiments, the processing system may use the transformer-based AI model to evaluate thematic and linguistic characteristics of the textual data derived from the primary and secondary content by using the speech recognition technology to transcribe the spoken words from the audio segment extracted from the received primary video stream and the audio segments extracted from the plurality of sources of the secondary video.

In some embodiments, the processing system may generate a similarity matrix based on the determined semantic similarity scores. For example, in some embodiments, the processing system may generate a matrix information structure in which each row corresponds to a vector embedding of the audio segment extracted from the received primary video stream, each column corresponds to vector embeddings of the audio segments extracted from the plurality of sources of the secondary video content, and each entry in the matrix information structure represents at least one of the determined semantic similarity scores.

In block 416, the processing system may use the determined semantic similarity scores to identify an advertisement in the secondary video content that has the highest semantic similarity score in relation to the audio segment extracted from the received primary video stream. For example, the processor may systematically review the similarity scores of all analyzed advertisements against a key scene from a popular cooking show that emphasizes fresh ingredients and healthy eating. By comparing these scores, the processor may identify a particular advertisement for a new organic food product that shares the highest semantic and thematic alignment with the cooking show segment. This alignment may be identified by overlapping keywords, thematic elements such as health and wellness, and similar emotional tones between the dialogue in the cooking show about fresh, natural ingredients and the advertisement's message promoting organic foods.

In some embodiments, the processing system may use the generated similarity matrix to identify the most contextually aligned advertisement for insertion into the primary video stream. The similarity matrix may be a structured representation that quantifies the semantic relationships between the primary audio segment and potential advertisements from secondary content. The similarity matrix may allow the processing system to systematically evaluate and rank the advertisements based on their semantic similarity scores relative to the primary content.

In block 418, the processing system may insert the identified advertisement into the primary video stream at an advertisement breakpoint indicated by the SCTE35/SCTE104 marker. For example, the processor may synchronize the selected organic food product advertisement with a scheduled ad break occurring right after the cooking show segment on healthy eating concludes. The processor may use the SCTE35/SCTE104 markers to accurately position the advertisement for a seamless transition from the primary content to the advertisement without disrupting the viewing experience. Such insertions may further improve the effectiveness and impact of the advertisement by using the thematic continuity between the show's focus on health and the advertisement's message to maintain viewer engagement through the break.

Figure 5:
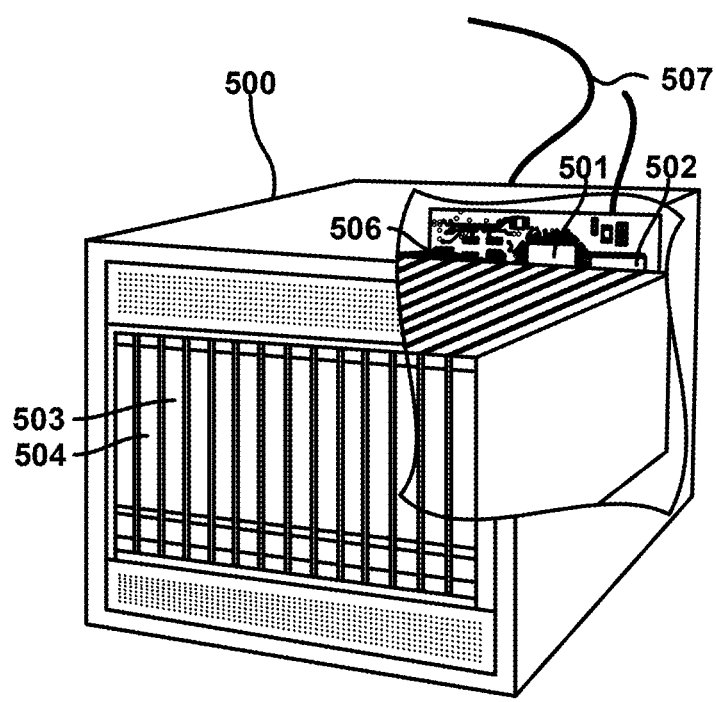
FIG. 5 is a component block diagram illustrating an example server computing system suitable for implementing various embodiments.

Various embodiments (including, but not limited to, embodiments described above with reference to FIGS. 1-4) may be implemented in fixed computing systems, such as any of a variety of generalized or specialize computing systems, an example of which in the form of a server computing system 500 is illustrated in FIG. 5. A server computing system 500 typically includes one or more multicore processor systems 501 coupled to volatile memory 502 and a large capacity nonvolatile memory, such as a nonvolatile disk drive 504. The processing systems 501 may include or be coupled to specialized processors 503 configured to perform calculations involved in neural network processing and machine learning such as graphical processing units (GPU), neural network processors and the like. In some implementations, multiple processing system and memory units 504 may be implemented within the computing system 500, such as to permit parallel processing and segmented processing of input data (e.g., image datasets) according to various embodiments. The server computing system 500 may also include network access ports 505 coupled to the multicore processor assemblies 501 for establishing network interface connections with a network 506, such as a local area network, the Internet, and other networks, such as for receiving image datasets and exporting completed OCR model training datasets.

Implementation examples are described in the following paragraphs. While some of the following implementation examples are described in terms of example methods, further example implementations may include the example methods discussed in the following paragraphs implemented by a computing device such as a server within a CDN including a processor configured with processor-executable instructions to perform operations of the methods of the following implementation examples; example methods discussed in the following paragraphs implemented by a server within a CDN including means for performing functions of the methods of the following implementation examples; and example methods discussed in the following paragraphs may be implemented as a non-transitory processor-readable storage medium having stored thereon processor-executable instructions configured to cause a server of a CDN to perform the operations of the methods of the following implementation examples.

Example 1: A method performed by a processing system in a network server computing device for inserting contextually relevant advertisements into a video stream, the method including receiving a primary video stream, extracting an audio segment from the received primary video stream in response to detecting an SCTE35/SCTE104 marker in the received primary video stream, extracting audio segments from a plurality of sources of secondary video content that include potential advertisements for insertion into the primary video stream, using speech recognition technology to transcribe spoken words from the audio segment extracted from the received primary video stream and the audio segments extracted from the plurality of sources of the secondary video content into textual data, using the textual data to query a large generative artificial intelligence model (LXM) to perform semantic analysis, generate semantic analysis results, and tokenize the generated semantic analysis results into tokenized data that includes sentences or semantically coherent units, transforming the tokenized data into vector embeddings, determining semantic similarity scores between the vector embeddings of the audio segment extracted from the received primary video stream and the audio segments extracted from the plurality of sources of the secondary video content, using the determined semantic similarity scores to identify an advertisement in the secondary video content that has the highest semantic similarity score in relation to the audio segment extracted from the received primary video stream, and inserting the identified advertisement into the primary video stream at an advertisement breakpoint indicated by the SCTE35/SCTE104 marker.

Example 2: The method of example 1, in which receiving the primary video stream includes receiving live or video-on-demand (VoD) content with embedded SCTE35/SCTE104 markers indicating potential advertisement insertion points.

Example 3: The method of any of the examples 1 and 2, in which extracting the audio segment from the received primary video stream in response to detecting the SCTE35/SCTE104 marker in the received primary video stream includes extracting the audio segment from the received primary video stream between one to two minutes prior to a designated advertisement break.

Example 4: The method of any of the examples 1-3, in which transforming the tokenized data into the vector embeddings further includes normalizing the vector embeddings to conform to input specifications of a feed-forward neural network.

Example 5: The method of any of the examples 1-4, further including generating a similarity matrix based on the determined semantic similarity scores, in which using the determined semantic similarity scores to identify an advertisement in the secondary video content that has the highest semantic similarity score in relation to the audio segment extracted from the received primary video stream includes using the generated similarity matrix to identify a most contextually aligned advertisement for insertion into the primary video stream.

Example 6: The method of any of the examples 1-5, in which generating the similarity matrix based on the determined semantic similarity scores includes generating a matrix information structure in which each row corresponds to a vector embedding of the audio segment extracted from the received primary video stream, each column corresponds to vector embeddings of the audio segments extracted from the plurality of sources of the secondary video content, and each entry in the matrix information structure represents at least one of the determined semantic similarity scores.

Example 7: The method of any of the examples 1-6, in which determining the semantic similarity scores between the vector embeddings of the audio segment extracted from the received primary video stream and the audio segments extracted from the plurality of sources of the secondary video content includes using a transformer-based model that includes multiple encoding and decoding layers to generate deep semantic analysis, and determining the semantic similarity scores based on the generated deep semantic analysis.

Example 8: The method of any of the examples 1-7, in which using the transformer-based model that includes multiple encoding and decoding layers to generate the deep semantic analysis includes using the transformer-based model to evaluate contextual and semantic relationships between the textual data derived from the primary and secondary content by using the speech recognition technology to transcribe the spoken words from the audio segment extracted from the received primary video stream and the audio segments extracted from the plurality of sources of the secondary video.

Example 9: The method of any of the examples 1-8, in which using the transformer-based model that includes multiple encoding and decoding layers to generate the deep semantic analysis includes using the transformer-based model to evaluate thematic and linguistic characteristics of the textual data derived from the primary and secondary content by using the speech recognition technology to transcribe the spoken words from the audio segment extracted from the received primary video stream and the audio segments extracted from the plurality of sources of the secondary video.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method performed by a processing system in a network server computing device for inserting contextually relevant advertisements into a video stream, the method comprising:
    receiving a primary video stream;
    extracting an audio segment from the received primary video stream in response to detecting an SCTE35/SCTE104 marker in the received primary video stream;
    extracting audio segments from a plurality of sources of secondary video content that include potential advertisements for insertion into the primary video stream;
    using speech recognition technology to transcribe spoken words from the audio segment extracted from the received primary video stream and the audio segments extracted from the plurality of sources of the secondary video content into textual data;
    using the textual data to query a large generative artificial intelligence model (LXM) to perform semantic analysis, generate semantic analysis results, and tokenize the generated semantic analysis results into tokenized data that includes sentences or semantically coherent units;
    transforming the tokenized data into vector embeddings;
    determining semantic similarity scores between the vector embeddings of the audio segment extracted from the received primary video stream and the audio segments extracted from the plurality of sources of the secondary video content;
    using the determined semantic similarity scores to identify an advertisement in the secondary video content that has the highest semantic similarity score in relation to the audio segment extracted from the received primary video stream; and
    inserting the identified advertisement into the primary video stream at an advertisement breakpoint indicated by the SCTE35/SCTE104 marker.

2. The method of claim 1, wherein receiving the primary video stream comprises receiving live or video-on-demand (VoD) content with embedded SCTE35/SCTE104 markers indicating potential advertisement insertion points.

3. The method of claim 1, wherein extracting the audio segment from the received primary video stream in response to detecting the SCTE35/SCTE104 marker in the received primary video stream comprises extracting the audio segment from the received primary video stream between one to two minutes prior to a designated advertisement break.

4. The method of claim 1, wherein transforming the tokenized data into the vector embeddings further comprises normalizing the vector embeddings to conform to input specifications of a feed-forward neural network.

5. The method of claim 1, further comprising generating a similarity matrix based on the determined semantic similarity scores, wherein using the determined semantic similarity scores to identify an advertisement in the secondary video content that has the highest semantic similarity score in relation to the audio segment extracted from the received primary video stream comprises using the generated similarity matrix to identify a most contextually aligned advertisement for insertion into the primary video stream.

6. The method of claim 5, wherein generating the similarity matrix based on the determined semantic similarity scores comprises generating a matrix information structure in which:
    each row corresponds to a vector embedding of the audio segment extracted from the received primary video stream;
    each column corresponds to vector embeddings of the audio segments extracted from the plurality of sources of the secondary video content; and
    each entry in the matrix information structure represents at least one of the determined semantic similarity scores.

7. The method of claim 1, wherein determining the semantic similarity scores between the vector embeddings of the audio segment extracted from the received primary video stream and the audio segments extracted from the plurality of sources of the secondary video content comprises:
    using a transformer-based model that includes multiple encoding and decoding layers to generate deep semantic analysis; and
    determining the semantic similarity scores based on the generated deep semantic analysis.

8. The method of claim 7, wherein using the transformer-based model that includes multiple encoding and decoding layers to generate the deep semantic analysis comprises using the transformer-based model to evaluate contextual and semantic relationships between the textual data derived from the primary and secondary content by using the speech recognition technology to transcribe the spoken words from the audio segment extracted from the received primary video stream and the audio segments extracted from the plurality of sources of the secondary video.

9. The method of claim 7, wherein using the transformer-based model that includes multiple encoding and decoding layers to generate the deep semantic analysis comprises using the transformer-based model to evaluate thematic and linguistic characteristics of the textual data derived from the primary and secondary content by using the speech recognition technology to transcribe the spoken words from the audio segment extracted from the received primary video stream and the audio segments extracted from the plurality of sources of the secondary video.

10. A computing device, comprising:
a processing system configured to:
receive a primary video stream;
extract an audio segment from the received primary video stream in response to detecting an SCTE35/SCTE104 marker in the received primary video stream;
extract audio segments from a plurality of sources of secondary video content that include potential advertisements for insertion into the primary video stream;
use speech recognition technology to transcribe spoken words from the audio segment extracted from the received primary video stream and the audio segments extracted from the plurality of sources of the secondary video content into textual data;
use the textual data to query a large generative artificial intelligence model (LXM) to perform semantic analysis, generate semantic analysis results, and tokenize the generated semantic analysis results into tokenized data that includes sentences or semantically coherent units;
transform the tokenized data into vector embeddings;
determine semantic similarity scores between the vector embeddings of the audio segment extracted from the received primary video stream and the audio segments extracted from the plurality of sources of the secondary video content;
use the determined semantic similarity scores to identify an advertisement in the secondary video content that has the highest semantic similarity score in relation to the audio segment extracted from the received primary video stream; and
insert the identified advertisement into the primary video stream at an advertisement breakpoint indicated by the SCTE35/SCTE104 marker.

11. The computing device of claim 10, wherein the processing system is configured to receive the primary video stream by receiving live or video-on-demand (VoD) content with embedded SCTE35/SCTE104 markers indicating potential advertisement insertion points.

12. The computing device of claim 10, wherein the processor is configured to extract the audio segment from the received primary video stream in response to detecting the SCTE35/SCTE104 marker in the received primary video stream by extracting the audio segment from the received primary video stream between one to two minutes prior to a designated advertisement break.

13. The computing device of claim 10, wherein the processing system is further configured to normalize the vector embeddings to conform to input specifications of a feed-forward neural network.

14. The computing device of claim 10, wherein the processing system is further configured to generate a similarity matrix based on the determined semantic similarity scores, wherein using the determined semantic similarity scores to identify an advertisement in the secondary video content that has the highest semantic similarity score in relation to the audio segment extracted from the received primary video stream comprises using the generated similarity matrix to identify a most contextually aligned advertisement for insertion into the primary video stream.

15. The computing device of claim 14, wherein the processing system is configured to generate the similarity matrix based on the determined semantic similarity scores by generating a matrix information structure in which:

each row corresponds to a vector embedding of the audio segment extracted from the received primary video stream;
each column corresponds to vector embeddings of the audio segments extracted from the plurality of sources of the secondary video content; and
each entry in the matrix information structure represents at least one of the determined semantic similarity scores.

16. The computing device of claim 10, wherein the processing system is configured to determine the semantic similarity scores between the vector embeddings of the audio segment extracted from the received primary video stream and the audio segments extracted from the plurality of sources of the secondary video content by:
using a transformer-based model that includes multiple encoding and decoding layers to generate deep semantic analysis; and
determining the semantic similarity scores based on the generated deep semantic analysis.

17. The computing device of claim 16, wherein the processing system is configured to use the transformer-based model that includes multiple encoding and decoding layers to generate the deep semantic analysis by using the transformer-based model to evaluate contextual and semantic relationships between the textual data derived from the primary and secondary content by using the speech recognition technology to transcribe the spoken words from the audio segment extracted from the received primary video stream and the audio segments extracted from the plurality of sources of the secondary video.

18. The computing device of claim 16, wherein the processing system is configured to use the transformer-based model that includes multiple encoding and decoding layers to generate the deep semantic analysis by using the transformer-based model to evaluate thematic and linguistic characteristics of the textual data derived from the primary and secondary content by using the speech recognition technology to transcribe the spoken words from the audio segment extracted from the received primary video stream and the audio segments extracted from the plurality of sources of the secondary video.

19. A non-transitory computer readable storage medium having stored thereon processor-executable software instructions configured to cause a processing system in a network server computing device to insert contextually relevant advertisements into a video stream, the operations comprising:
receiving a primary video stream;
extracting an audio segment from the received primary video stream in response to detecting an SCTE35/SCTE104 marker in the received primary video stream;
extracting audio segments from a plurality of sources of secondary video content that include potential advertisements for insertion into the primary video stream;
using speech recognition technology to transcribe spoken words from the audio segment extracted from the received primary video stream and the audio segments extracted from the plurality of sources of the secondary video content into textual data;
using the textual data to query a large generative artificial intelligence model (LXM) to perform semantic analysis, generate semantic analysis results, and tokenize the generated semantic analysis results into tokenized data that includes sentences or semantically coherent units;
transforming the tokenized data into vector embeddings;

determining semantic similarity scores between the vector embeddings of the audio segment extracted from the received primary video stream and the audio segments extracted from the plurality of sources of the secondary video content;

using the determined semantic similarity scores to identify an advertisement in the secondary video content that has the highest semantic similarity score in relation to the audio segment extracted from the received primary video stream; and inserting the identified advertisement into the primary video stream at an advertisement breakpoint indicated by the SCTE35/SCTE104 marker.

20. The non-transitory computer readable storage medium of claim 19, wherein the stored processor-executable software instructions are configured to cause a processor to perform operations such that receiving the primary video stream comprises receiving live or video-on-demand (VoD) content with embedded SCTE35/SCTE104 markers indicating potential advertisement insertion points.

21. The non-transitory computer readable storage medium of claim 19, wherein the stored processor-executable software instructions are configured to cause a processor to perform operations such that extracting the audio segment from the received primary video stream in response to detecting the SCTE35/SCTE104 marker in the received primary video stream comprises extracting the audio segment from the received primary video stream between one to two minutes prior to a designated advertisement break.

22. The non-transitory computer readable storage medium of claim 19, wherein the stored processor-executable software instructions are configured to cause a processor to perform operations such that transforming the tokenized data into the vector embeddings further comprises normalizing the vector embeddings to conform to input specifications of a feed-forward neural network.

23. The non-transitory computer readable storage medium of claim 19, wherein the stored processor-executable software instructions are configured to cause a processor to perform operations further comprising generating a similarity matrix based on the determined semantic similarity scores, wherein using the determined semantic similarity scores to identify an advertisement in the secondary video content that has the highest semantic similarity score in relation to the audio segment extracted from the received primary video stream comprises using the generated similarity matrix to identify a most contextually aligned advertisement for insertion into the primary video stream.

24. The non-transitory computer readable storage medium of claim 23, wherein the stored processor-executable software instructions are configured to cause a processor to perform operations such that generating the similarity matrix based on the determined semantic similarity scores comprises generating a matrix information structure in which:

each row corresponds to a vector embedding of the audio segment extracted from the received primary video stream;

each column corresponds to vector embeddings of the audio segments extracted from the plurality of sources of the secondary video content; and each entry in the matrix information structure represents at least one of the determined semantic similarity scores.

25. The non-transitory computer readable storage medium of claim 19, wherein the stored processor-executable software instructions are configured to cause a processor to perform operations such that determining the semantic similarity scores between the vector embeddings of the audio segment extracted from the received primary video stream and the audio segments extracted from the plurality of sources of the secondary video content comprises:

using a transformer-based model that includes multiple encoding and decoding layers to generate deep semantic analysis; and determining the semantic similarity scores based on the generated deep semantic analysis.

26. The non-transitory computer readable storage medium of claim 25, wherein the stored processor-executable software instructions are configured to cause a processor to perform operations such that using the transformer-based model that includes multiple encoding and decoding layers to generate the deep semantic analysis comprises using the transformer-based model to evaluate contextual and semantic relationships between the textual data derived from the primary and secondary content by using the speech recognition technology to transcribe the spoken words from the audio segment extracted from the received primary video stream and the audio segments extracted from the plurality of sources of the secondary video.

27. The non-transitory computer readable storage medium of claim 25, wherein the stored processor-executable software instructions are configured to cause a processor to perform operations such that using the transformer-based model that includes multiple encoding and decoding layers to generate the deep semantic analysis comprises using the transformer-based model to evaluate thematic and linguistic characteristics of the textual data derived from the primary and secondary content by using the speech recognition technology to transcribe the spoken words from the audio segment extracted from the received primary video stream and the audio segments extracted from the plurality of sources of the secondary video.

\* \* \* \* \*